US006952783B2

(12) United States Patent
Koertzen et al.

(10) Patent No.: US 6,952,783 B2
(45) Date of Patent: Oct. 4, 2005

(54) MULTIPLE RETURN TERMINAL POWER SUPPLY METHODS AND APPARATUS

(75) Inventors: Henry W. Koertzen, Hillsboro, OR (US); Lilly Huang, Portland, OR (US); John T. Sprietsma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 09/992,244

(22) Filed: Nov. 14, 2001

(65) Prior Publication Data

US 2003/0090248 A1 May 15, 2003

(51) Int. Cl.[7] .............................. G06F 1/26; H02J 1/00; H02J 1/10
(52) U.S. Cl. ........................ 713/300; 713/330; 307/43; 307/52
(58) Field of Search ................................ 713/300, 330; 323/265, 266, 271, 272; 307/43, 52, 44, 71; 361/146, 147

(56) References Cited

U.S. PATENT DOCUMENTS

| | | | | |
|---|---|---|---|---|
| 5,561,792 A | * | 10/1996 | Ganapathy | 713/501 |
| 5,574,697 A | * | 11/1996 | Manning | 365/226 |
| 5,914,873 A | | 6/1999 | Blish, II | 363/147 |
| 5,952,733 A | * | 9/1999 | Johnston | 307/44 |
| 6,075,741 A | * | 6/2000 | Ma et al. | 365/226 |
| 6,189,107 B1 | | 2/2001 | Kim et al. | 713/300 |
| 6,429,630 B2 | * | 8/2002 | Pohlman et al. | 323/272 |
| 6,819,537 B2 | * | 11/2004 | Pohlman et al. | 361/64 |

OTHER PUBLICATIONS

Pohlman et al., U.S. Provisional Appl. No. 60/277,839, "Independent Domain Control Apparatus and Techniques", filed Mar. 22, 2001.*
Bindra, A., "Multiphase Controller Meets Pentium's Power Demands", (visited on Mar. 12, 2002), <www.planetee.com/planetee/servlet/DisplayDocument?ArticleID=1288>, pp. 1–3, (Aug. 3, 1998).

* cited by examiner

Primary Examiner—John R. Cottingham
Assistant Examiner—James K. Trujillo
(74) Attorney, Agent, or Firm—Schwegman, Lundberg, Woessner & Kluth, P.A.

(57) ABSTRACT

A power supply system, a circuit board, and a computer, as well as a method of providing power to a circuit element are disclosed. The power supply system may include two or more voltage sources coupled to a circuit element. The voltage output of one voltage source may be coupled to one portion of a plurality of power and return connection terminals on the circuit element, and the voltage output of another voltage source may be coupled to another portion of the plurality of power and return connection terminals. The method may include selecting the portions of the power and return connection terminals, and connecting voltage sources to the selected portions.

26 Claims, 5 Drawing Sheets

MULTIPLE RETURN TERMINAL POWER SUPPLY METHODS AND APPARATUS

FIELD OF THE INVENTION

The present invention relates generally to the use of power supply systems. More particularly, the present invention relates to the application of power supply circuitry and systems so as to improve the regulation and dynamic response of the supplied voltage, as well as its current distribution.

BACKGROUND INFORMATION

High-speed circuitry, such as that used in modem microprocessors, demands the presence of a high-performance power supply. That is, voltage regulators that supply power to a central processing unit (CPU), for example, must provide high-speed dynamic response and tight voltage tolerance. Essentially, a responsive power source (e.g., a local switching regulator), along with low impedance power delivery and decoupling are required. Unfortunately, the speed of voltage regulators available today continues to be constrained by power field effect transistor (FET) device technology. The presence of decoupling capacitors, device packaging, sockets, and circuit boards also serves to limit the designer's ability to deliver low impedance power.

For example, in the case of a CPU, power is typically applied to one side of a multi-sided CPU socket attached to a motherboard. Even if a state of the art voltage regulator and decoupling capacitors are used, large voltage droops may appear at the socket pins, as well as unbalanced current distribution. Ultimately, CPU socket power delivery capability is limited, the performance of the CPU may be affected, and the socket life may be shortened.

This can be easily seen with reference to prior art FIG. 1, illustrating a single voltage regulator (VR) which provides power to a socketed CPU. For convenience, the socket sides can be labeled as North "N" and South "S". The VR 101 powers the socketed CPU 102 by way of the socket pins 103 (on the N side of the socket) and socket pins 104 (on the S side of the socket), as well as by using the motherboard traces 105. Such prior art power delivery systems are subject to voltage droops on the order of 10%, or greater, as the CPU 102 operates and current demands rapidly change. Because the current required by the CPU 102 flows through unequal impedances (since the impedance of the motherboard traces 105 is added to that of the S socket pins 104, and not to the impedance of the N socket pins 103), the current from the VR 101 is not shared equally between the N side socket pins and the S side socket pins. The increased impedance provided by the motherboard traces 105 also tends to increase the voltage droop of the VR 101.

Thus, there is a need to provide a power supply method and apparatus which minimizes the inequitable distribution of current of the prior art, increasing CPU socket life. Such a method and apparatus should also operate to increase the ability of voltage regulators to provide a tightly controlled source of voltage, reducing the amount of droop encountered when large quantities of current must be delivered quickly.

DESCRIPTION OF THE PREFERRED EMBODIMENTS

Figure 1:
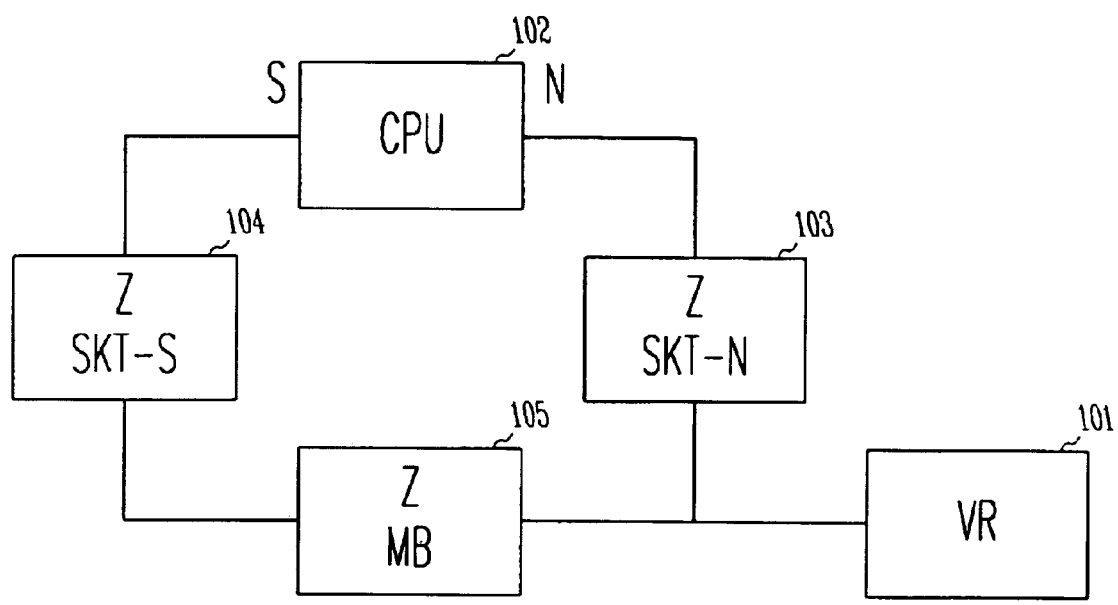
FIG. 1, previously described, is a block diagram of a prior art power supply system.

In the following detailed description of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the invention. Other embodiments may be utilized and derived therefrom, such that structural, logical, and electrical circuit substitutions and changes may be made without departing from the scope of the invention. The following detailed description, therefore, is not to be taken in a limiting sense, and the scope of the invention is defined only by the appended claims, along with the full range of equivalents to which such claims are entitled.

Figure 2:
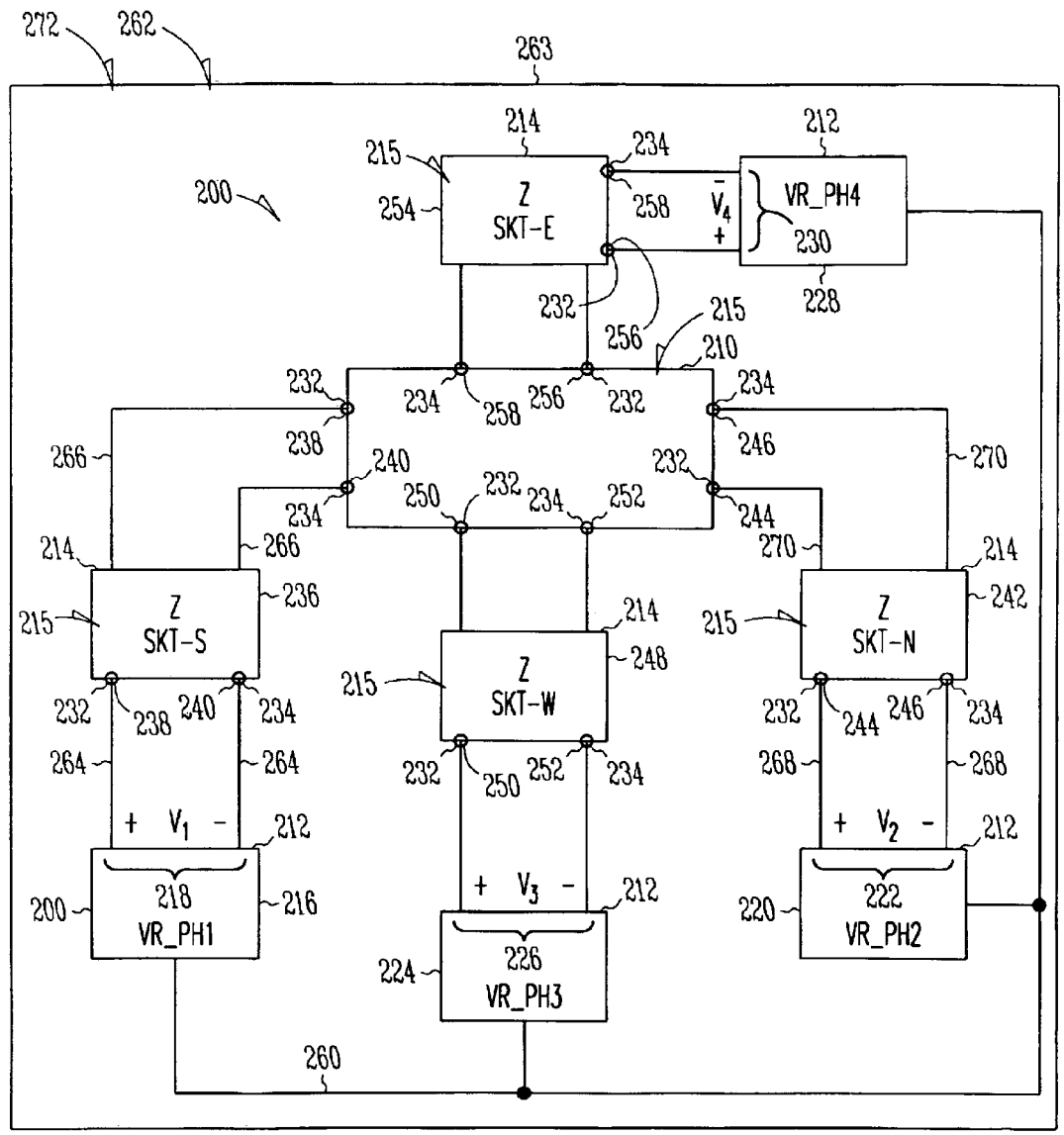
FIG. 2 is a block diagram of a power supply system, circuit board, and computer, according to various embodiments of the present invention.

FIG. 2 includes a block diagram of a power supply system according to an embodiment of the present invention. The power supply system 200 may include an electrical circuit 210 with a plurality of power and return connection terminals, with power supplied by two or more voltage sources 212. The power may be supplied directly to the power and return connection terminals of the circuit 210, or to one or more sockets 214, via power and return connection terminals which may be electrically coupled to the circuit 210 and the voltage sources 212. Thus, power may be supplied to a circuit element 215, which may be a CPU, a microprocessor, a memory, an integrated circuit, or indeed, any circuit which uses electrical power, or which delivers electrical power, such as a socket, or socket pins, or a combination of circuitry and sockets, such as a microprocessor mounted in a socket.

The system 200 may include one voltage source 216 having a phase output 218 at a voltage $V_1$. The system may include another voltage source 220 having a phase output 222 at a voltage $V_2$. The system 200 may also include any number of additional voltage sources, such as voltage source 224 having a phase output 226 at a voltage $V_3$, and a voltage source 228 having a phase output 230 at a voltage $V_4$, for example. It should be noted that the nominal values or magnitudes of the voltages $V_1$, $V_2$, $V_3$, and $V_4$ are usually selected to be approximately equal. As used herein, voltages are "approximately" equal when they are within the published manufacturer's supply voltage tolerances for the circuit logic with which they are used (e.g. Some "3.3" volt logic may have a specified supply voltage tolerance of about 1.8 volts to 3.6 volts; in this case any voltages supplied between these extremes can be considered "approximately equal".).

Each one of the voltage sources 216, 220, 224, and 228 may be electrically coupled to the circuit element 215, such as by using the power and return connection terminals of the sockets 214 and/or the power and return connection terminals of the electrical circuit 210. Typically, the power and return connection terminals of the circuit element 215 are grouped into two or more sets of power connection terminals 232 and return connection terminals 234. Thus, for example, the voltage source 216 may be electrically coupled to the socket 236 or the electrical circuit 210 via the power connection terminal 238 and the return connection terminal 240, and the voltage source 220 may be electrically coupled to the socket 242 or the electrical circuit 210 via power connection terminal 244 and the return connection terminal 246. Similarly, the voltage source 224 may be electrically coupled to the socket 248 or the electrical circuit 210 via power connection terminal 250 and the return connection terminal 252, and the voltage source 228 may be electrically coupled to the socket 254 or the electrical circuit 210 via power connection terminal 256 and the return connection terminal 258.

In essence, the circuit element 215 will include a plurality of power and return connection terminals, which may be grouped into individual sets or portions of power and return connection terminals (e.g., sometimes designated as pin pairs). Each portion may then be connected to a separate power source phase output. The number of portions will typically depend on the ability of the voltage sources to supply current and control voltage according to the demands of the circuit element 215. While four portions are shown in FIG. 2, it should be noted that any number of portions may be selected by the designer of the power system 200, with the minimum number of portions being two. As used herein, a "connection terminal" may be any type of substance, device, or mechanism used to make an electrical connection between an electrical circuit and/or socket and a voltage source, including but not limited to spring pins, socket pins, solder, solder pads, and integrated circuit leads of all types.

In any case, the designer will typically select the number of terminals in each portion to be approximately equal, or some other number which will maximize the likelihood that substantially equal amounts of current will flow through the power and return connection terminals 232, 234 during the time power is supplied to the circuit element 215. Moreover, the designer will also typically select the number of power connection terminals 232 and the number of return connection terminals 234 to be approximately equal, or some other number which will maximize the likelihood that substantially equal amounts of current will flow through the power and return connection terminals 232, 234 during the time power is supplied to the circuit element 215.

It should also be noted that the voltage sources may each comprise a separate voltage regulator. Alternatively, any two or more voltage sources may be included in a single voltage regulator. For example, each one of the voltage sources 216, 220, 224, and 228 may each be similar to, or identical to a Semtech SC1153 coupled to the power transistors, inductors, gate drivers, capacitors and/or other components required to construct a single phase VR, as is well known to those skilled in the art. Alternatively, all of the voltage sources 216, 220, 224, and 228 may be included in a single voltage regulator, similar to, or identical to a single Semtech SC1144 unit coupled to the power transistors, inductors, gate drivers, capacitors and/or other components required to construct a multi-phase VR, as is well known to those skilled in the art. That is, a single controller may be used in conjunction with all of the voltage sources 216, 220, 224, and 228, or a separate controller may be used for each voltage source. If desired, the system 200 may include a phase synchronizing connection 260 between two or more of the sources 216, 220, 224, and 228, which allows the ripple of each voltage source to be distributed out of phase with the other voltage sources, such that the ripple present at the outputs $V_1$, $V_2$, $V_3$, and $V_4$ is not allowed to accumulate.

Another embodiment of the invention is illustrated in FIG. 2, namely, a circuit board 262, which may include two or more voltage sources 212 attached to a circuit card 263, with each source 216, 220, 224, and 228 having a phase output 218, 222, 226, and 230, and a voltage $V_1$, $V_2$, $V_3$, and $V_4$, respectively. Of course, as noted above, the magnitude of each of the voltages $V_1$, $V_2$, $V_3$, and $V_4$ may be approximately equal. Also, all of the voltage sources 216, 220, 224, and 228 may be included in a single voltage regulator, or each one of the voltage sources 216, 220, 224, and 228 may be included in a separate regulator, and the circuit board 262 may include a phase synchronizing connection 260

The circuit board 262 also may include a circuit element 215 attached to the circuit card 263. The circuit element 215 may be electrically coupled to the voltage sources 216, 220, 224, and 228. The circuit element 215, which may be a microprocessor, an integrated circuit, a socket, or a combination of these, for example, may include a plurality of power connection terminals 232 and a plurality of return connection terminals 234. One portion of the plurality of power connection terminals 238 (which may include one or more individual power connection terminals) and one portion of the plurality of return connection terminals 240 (which may include one or more individual return connection terminals) may be connected to a phase output 218 using a plurality of traces 264, 266 on the circuit card 263, while another portion of the plurality of power connection terminals 244 and a portion of the plurality of return connection terminals 246 may be connected to another phase output 222 using another plurality of traces 268, 270 on the circuit card 263.

Yet another embodiment of the invention is illustrated in FIG. 2, namely, a computer 272, which may include two or more voltage sources 212 attached to the circuit card 263, with each source 216, 220, 224, and 228 having a phase output 218, 222, 226, and 230, and a voltage $V_1$, $V_2$, $V_3$, and $V_4$, respectively. As noted above, the magnitude of each of the voltages $V_1$, $V_2$, $V_3$, and $V_4$ may be approximately equal. Also, all of the voltage sources 216, 220, 224, and 228 may be included in a single voltage regulator, or each one of the voltage sources 216, 220, 224, and 228 may be included in a separate regulator, and the computer 272 may include a phase synchronizing connection 260

The computer 272 also may include a circuit element 215 attached to the card 263. The element 215 may be electrically coupled to the voltage sources 216, 220, 224, and 228. The circuit element, which may be a microprocessor, a CPU, or a microprocessor mounted in a socket, for example, may include a plurality of power connection terminals 232 and a plurality of return connection terminals 234. One portion of the plurality of power connection terminals 238 (which may include one or more individual power connection terminals) and one portion of the plurality of return connection terminals 240 (which may include one or more individual return connection terminals) may be connected to a phase output 218 using a plurality of traces 264, 266 on the circuit card 263, while another portion of the plurality of power connection terminals 244 and a portion of the plurality of return connection terminals 246 may be connected to another phase output 222 using another plurality of traces 268, 270 on the circuit card 263.

One of ordinary skill in the art will understand that the power supply system of the present invention can be used in applications other than for circuit boards and computers, and thus, the invention is not to be so limited. The illustrations of a power supply system 200, a circuit board 262, and a computer 272 are intended to provide a general understanding of the structure of the present invention, and are not intended to serve as a complete description of all the elements and features of power supply systems, circuit boards, and computers which might make use of the circuitry and structures described herein.

Applications which may include the novel power supply system, circuit board, and computer of the present invention include electronic circuitry used in high-speed computers, device drivers, power modules, communication circuitry, modems, processor modules, embedded processors, and application-specific modules, including multilayer, multichip modules. Such power supply systems, circuit boards, and computers may further be included as sub-components within a variety of electronic systems, such as televisions, cellular telephones, personal computers, personal radios, aircraft, and others.

Figure 3:
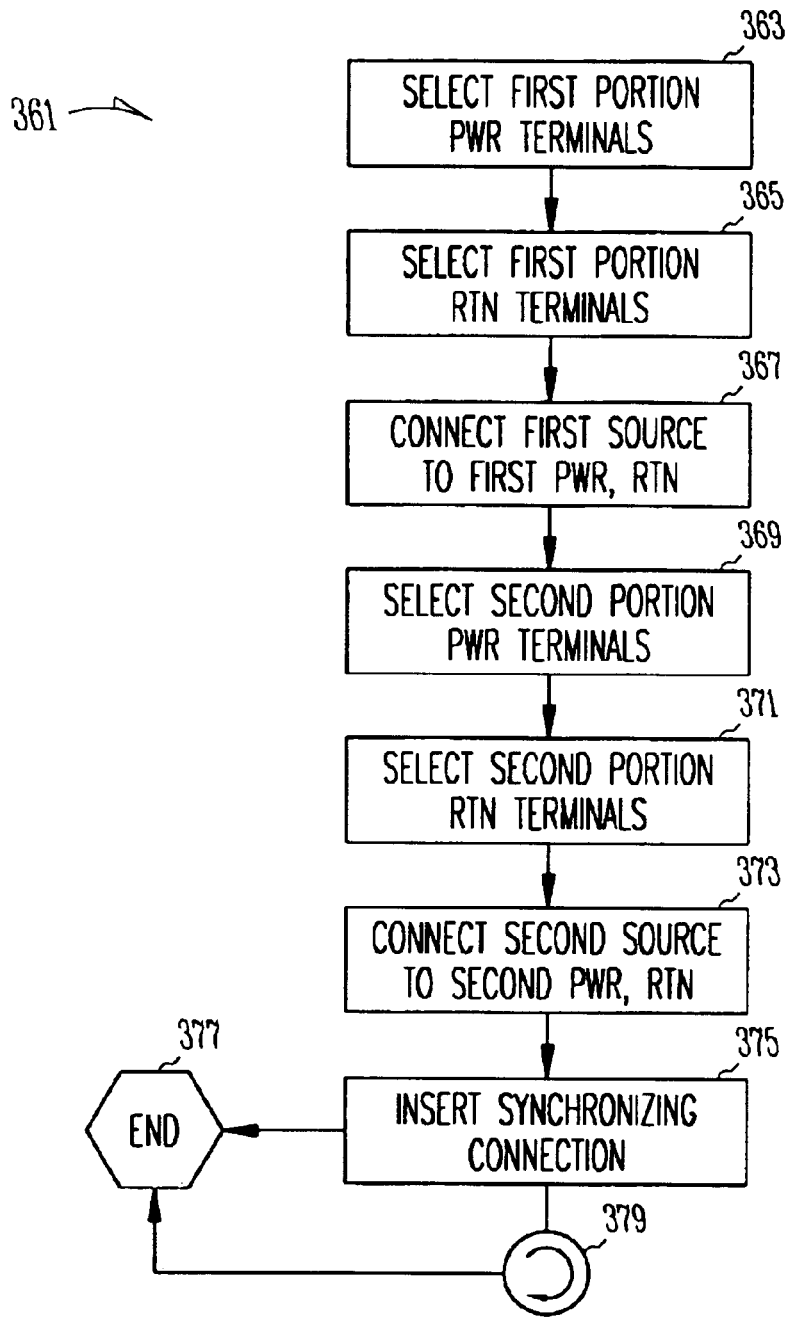
FIG. 3 is a flow chart illustrating a method of providing power to a circuit element, according to an embodiment of the present invention.

FIG. 3 is a flow chart illustrating a method of providing power to a circuit element, according to an embodiment of the present invention. Considering a circuit element with a plurality of power connection terminals and a plurality of return connection terminals, the method 361 may include selecting a portion of the plurality of power connection terminals electrically coupled to the circuit element (at block 363) and selecting a portion of the plurality of return connection terminals electrically coupled to the circuit element (at block 365). The method 361 may also include connecting a phase output supplied at a voltage (e.g., $V_1$) of a voltage source to the selected portions of the pluralities of power and return terminals. As noted previously, the circuit element may be a microprocessor, a socket, or a combination of these, among other possibilities.

Going on to block 369, it can be seen that the method may include selecting another portion of the plurality of power connection terminals electrically coupled to the circuit element, as well as selecting another portion of the plurality of return connection terminals electrically coupled to the circuit element (at block 371); and then connecting a phase output of another voltage source at another voltage (e.g., $V_2$) to the these newly-selected portions of the pluralities of power and return terminals at block 373. Typically, each phase output is supplied at a voltage which is approximately equal to that which is available at the other phase outputs (e.g., $V_1 \approx V_2$). As noted above, each phase output may be supplied by a single voltage regulator, or separate voltage regulators.

The method may also include the step of inserting a phase synchronizing connection between the voltage sources at block 375. Finally the method may end at block 377, or continue with repeatedly selecting other portions of the plurality of power and return connection terminals, and connecting the selected portions of connection terminals to additional voltage sources, along with making additional phase synchronizing connections (blocks 363–375) at block 379.

Figure 4:
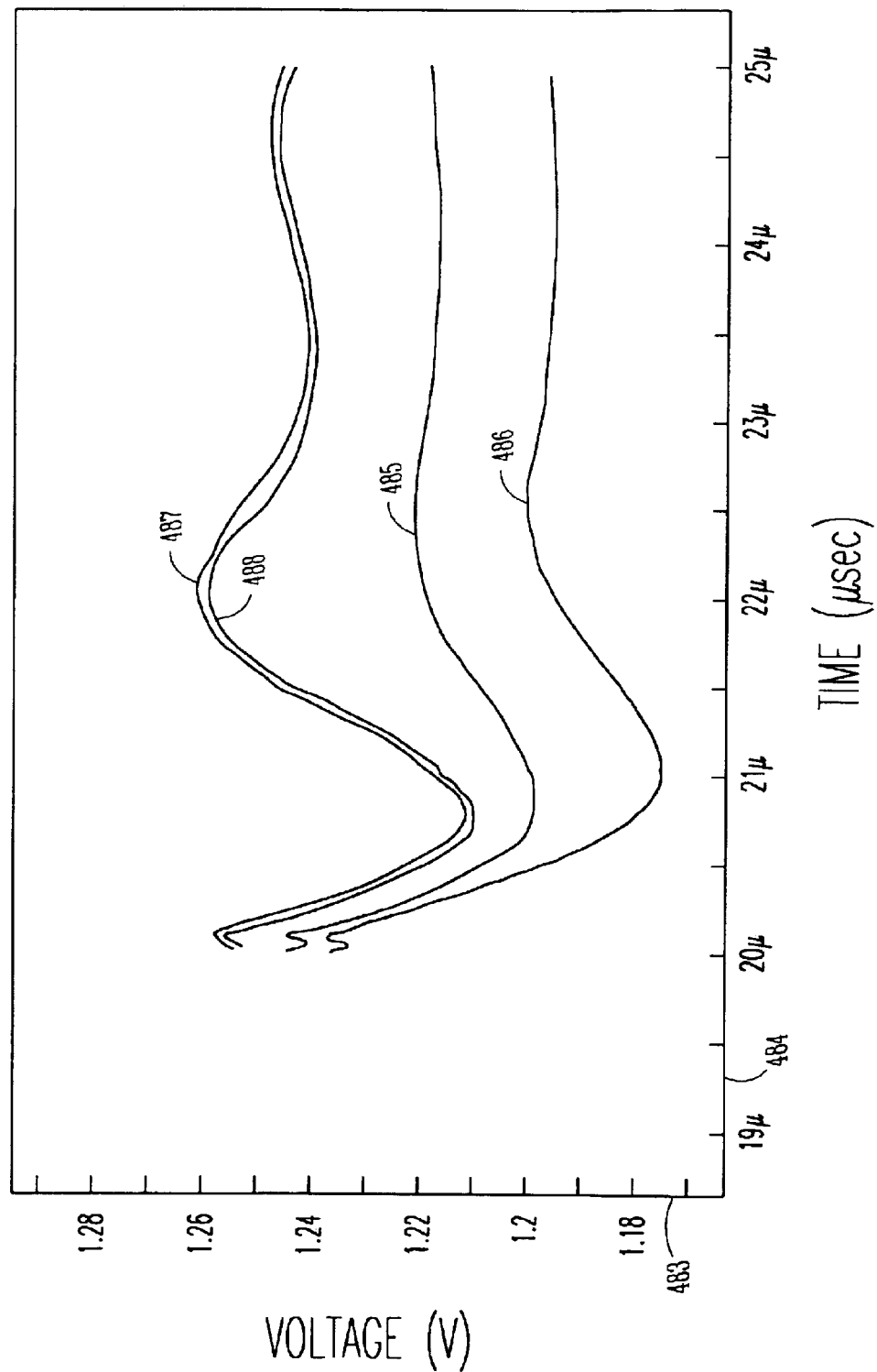
FIG. 4 is a graph which shows the improvement in supply voltage droop which may be obtained using an embodiment of the present invention.

FIG. 4 is a graph which shows the improvement in supply voltage droop which may be obtained using an embodiment of the present invention. The graph 482 illustrates the supply source voltage 483 present at the connection terminals of a socketed CPU, versus time 484. If the CPU is powered as shown in prior art FIG. 1, then the voltage droop at the N and S sides of the socket may be in accordance with the curves 485 and 486, respectively. However, if the CPU is powered as shown in FIG. 2, according to the teachings of the present invention, then the voltage droop at opposing sides of the socket (e.g., N and S, which correspond to $V_1$ and $V_2$), as measured at the power and return connection terminals 238, 244 and 240, 246, respectively, may be in accordance with the curves 487 and 488, respectively. In this case, the transient voltage droop using the system and method of the present invention has been reduced by about 20%.

Figure 5:
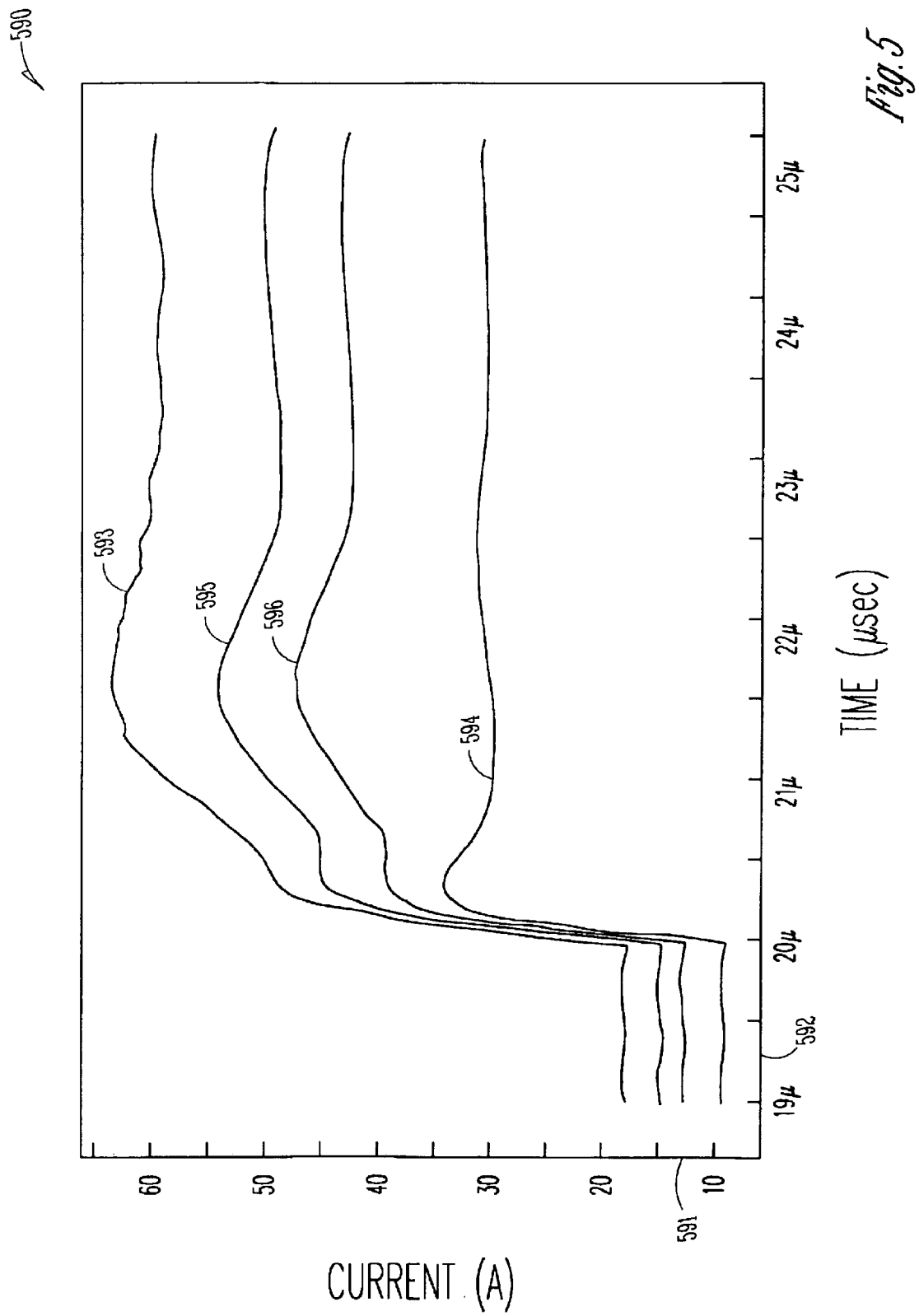
FIG. 5 is a graph which shows the improvement in supply current distribution which may be obtained using an embodiment of the present invention.

FIG. 5 is a graph illustrating another improvement which may be obtained by using an embodiment of the present invention, namely, better supply current distribution. The graph 590 illustrates supply source current 591 present at the connection terminals of a socketed CPU, versus time 592. If the CPU is powered as shown in prior art FIG. 1, then the current flowing through the N and S sides of the socket may be in accordance with the curves 593 and 594, respectively. However, if the CPU is powered as shown in FIG. 2, according to the teachings of the present invention, then the current flow through opposing sides of the socket (e.g., N and S, which correspond to currents associated with $V_1$ and $V_2$), as measured at the power and return connection terminals 238, 244 and 240, 246, respectively, may be in accordance with the curves 595 and 596, respectively. In this case, the current flow variation has been reduced by about 400%. This reduction, as well as that in the voltage droop, have been obtained without increasing the motherboard real estate (assuming a single VR with multiple phase outputs is used), replacing the CPU socket, or changing the socket power and ground pin definitions.

The system, circuit board, computer, and method of the invention provide for the equitable distribution of current to a circuit element, such as a socketed CPU, as well as reduced voltage droop when increased demands for current arise. The invention also prolongs socket life, and enables voltage sources to exhibit tighter control on the voltage supplied to various circuit elements.

Although specific embodiments have been illustrated and described herein, those of ordinary skill in the art appreciate that any arrangement which is calculated to achieve the same purpose may be substituted for the specific embodiment shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures, circuitry, and methods are used. The scope of the invention should be determined with reference to the appended claims, along with the full range of equivalents to which such claims are entitled

What is claimed is:

1. A power supply system, comprising:
   a first voltage source having a first output at a first voltage;
   a second voltage source having a second output at a second voltage approximately equal to the first voltage; and
   a circuit element having a plurality of power connection terminals and a plurality of return connection terminals, wherein a first portion of the plurality of power connection terminals and a first portion of the plurality of return connection terminals are connected to the first output, and wherein a second portion of the plurality of power connection terminals and a second portion of the plurality of return connection terminals are connected to the second output.

2. The power supply system of claim 1, wherein the first and second voltage sources are included in a single voltage regulator.

3. The power supply system of claim 1, wherein the first voltage source is included in a first voltage regulator and the second voltage source is included in a second voltage regulator.

4. The power supply system of claim 3, wherein the first output includes a first phase and the second output includes a second phase, further comprising:
  a phase synchronizing connection between the first and second voltage regulators.

5. The power supply system of claim 1, wherein the circuit element is a microprocessor.

6. The power supply system of claim 1, wherein the circuit element is a socket.

7. The power supply system of claim 1, further comprising:
  a third voltage source having a third output at a third voltage approximately equal to the first voltage, wherein a third portion of the plurality of power connection terminals and a third portion of the plurality of return connection terminals are connected to the third output.

8. The power supply system of claim 7, further comprising:
  a fourth voltage source having a fourth output at a fourth voltage approximately equal to the first voltage, wherein a fourth portion of the plurality of power connection terminals and a fourth portion of the plurality of return connection terminals are connected to the fourth output.

9. The power supply system of claim 8, wherein the first output includes a first phase, the second output includes a second phase, the third output includes a third phase, and the fourth output includes a fourth phase, further comprising:
  a phase synchronizing connection between the first, second, third, and fourth voltage sources.

10. The power supply system of claim 1, wherein the first portion of the plurality of power connection terminals is equal in number to the first portion of the plurality of return connection terminals, and wherein the second portion of the plurality of power connection terminals is equal in number to the second portion of the plurality of return connection terminals.

11. A circuit board, comprising:
  a circuit card;
  a first voltage source attached to the circuit card and having a first output at a first voltage;
  a second voltage source attached to the circuit card and having a second output at a second voltage approximately equal to the first voltage; and
  a circuit element attached to the circuit card and having a plurality of power connection terminals and a plurality of return connection terminals, wherein a first portion of the plurality of power connection terminals and a first portion of the plurality of return connection terminals are connected to the first output using a first plurality of traces on the circuit card, and wherein a second portion of the plurality of power connection terminals and a second portion of the plurality of return connection terminals are connected to the second output using a second plurality of traces on the circuit card.

12. The circuit board of claim 11, wherein the circuit element is a microprocessor.

13. The circuit board of claim 11, wherein the circuit element is a socket.

14. The circuit board of claim 11, wherein the first and second voltage sources are included in a single voltage regulator.

15. The circuit board of claim 11, wherein the first voltage source is included in a first voltage regulator and the second voltage source is included in a second voltage regulator.

16. The circuit board of claim 15, wherein the first output includes a first phase and the second output includes a second phase, further comprising:
  a phase synchronizing connection between the first and second voltage regulators.

17. A computer, comprising:
  a microprocessor mounted in a socket having a plurality of power connection terminals and a plurality of return connection terminals;
  a first voltage source having a first output at a first voltage connected to a first portion of the plurality of power connection terminals and a first portion of the plurality of return connection terminals; and
  a second voltage source having a second output at a second voltage approximately equal to the first voltage, wherein the second output is connected to a second portion of the plurality of power connection terminals and a second portion of the plurality of return connection terminals.

18. The computer of claim 17, wherein the first and second voltage sources are included in a single voltage regulator.

19. The computer of claim 17, wherein the first voltage source is included in a first voltage regulator and the second voltage source is included in a second voltage regulator.

20. The computer of claim 19, wherein the first output includes a first phase and the second output includes a second phase, further comprising:
  a phase synchronizing connection between the first and second voltage sources.

21. A method of providing power to a circuit element, comprising:
  selecting a first portion of a plurality of power connection terminals electrically coupled to the circuit element;
  selecting a first portion of a plurality of return connection terminals electrically coupled to the circuit element;
  connecting a first output supplied at a first voltage of a first voltage source to the first portions of the pluralities of power and return terminals;
  selecting a second portion of the plurality of power connection terminals electrically coupled to the circuit element;
  selecting a second portion of the plurality of return connection terminals electrically coupled to the circuit element; and
  connecting a second output of a voltage source to the second portions of the pluralities of power and return terminals, wherein the second output is supplied at a second voltage approximately equal to the first voltage.

22. The method of claim 21, wherein the first and second phase outputs are supplied by a single voltage regulator.

23. The method of claim 21, wherein the first output is supplied by a first voltage regulator and the second output is supplied by a second voltage regulator.

24. The method of claim 23, wherein the first output includes a first phase and the second output includes a second phase, further comprising:
  inserting a phase synchronizing connection between the first and second voltage regulators.

25. The method of claim 21, wherein the circuit element is a microprocessor.

26. The method of claim 21, wherein the circuit element is a socket.

* * * * *